April 23, 1963     J. C. NOVELLO     3,086,497
BRINE SHRIMP HATCHING APPARATUS
Filed June 23, 1961
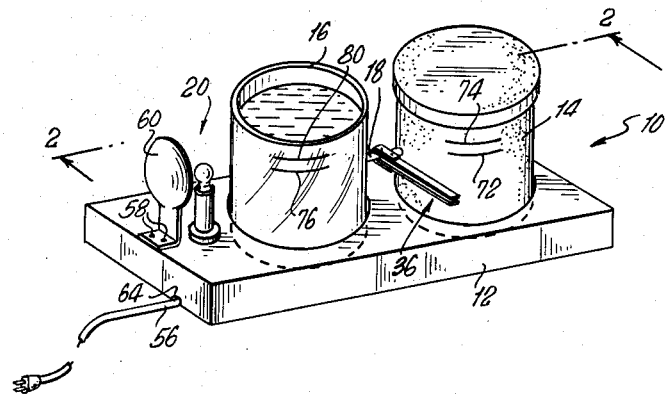
FIG. 1
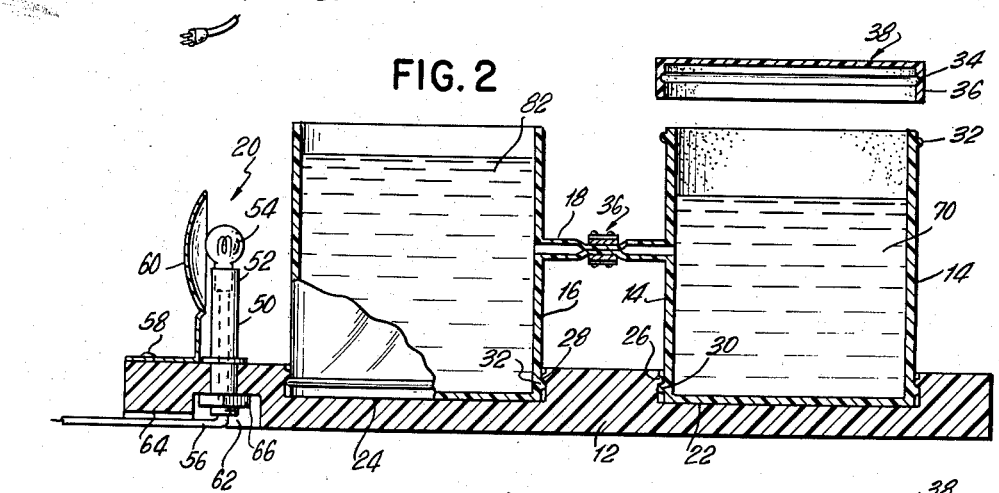
FIG. 2
FIG. 3
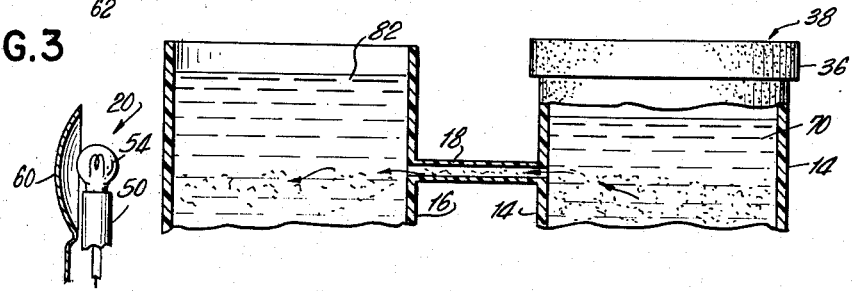
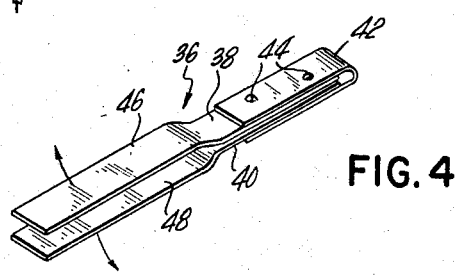
FIG. 4
INVENTOR.
JOHN C. NOVELLO
BY Amster & Levy
ATTORNEYS 3,086,497
BRINE SHRIMP HATCHING APPARATUS
John C. Novello, 32 Coolidge St., North Bellmore, N.Y.
Filed June 23, 1961, Ser. No. 119,078
5 Claims. (Cl. 119—2)

This invention relates to the class of animal husbandry and more particularly to a method and apparatus for the hatching of brine shrimp.

In the care and maintenance of aquariums such as are widely employed for tropical fish, it has been found that all of the various species of fish, including tropical fish, thrive best on live food. Further, when breeding various species of tropical fish, it has been found that fertility is vastly increased when live food is provided. Newly hatched shrimp are well known to be a prime source of live food and are widely used for such purposes. These shrimps are generally hatched in any suitable container using a suitable salt with water to form a brine solution. After the shrimp are hatched, they are ready to be used as food. Pouring the shrimp with the brine solution will contaminate the fresh water in the aquarium in which the tropical fish are kept. Further, the residue from the hatching of the shrimp should not be allowed to contaminate the aquarium.

It is therefore an object of this invention to provide a method and apparatus for hatching shrimp which eliminates the possibility of contamination of the fresh water of an aquarium for tropical fish with residues of the hatching of the shrimp and with the brine solution in which the shrimp are hatched.

In accordance with the illustrative embodiment of the invention, there is provided a brine shrimp hatching apparatus in which a pair of containers are disposed in spaced relationship and interconnected by a flexible tube. One of the containers is opaque and the other transparent. The brine shrimp are hatched in the opaque container and thereafter the transparent container is filled with fresh water above the level of the brine solution in the hatching tank. A light source is then directed through the fresh water and the tube interconnecting the tube containers so that the shrimp in the brine container are lured into the tube and thence into the container of fresh water. The fresh water container can be overturned with respect to the brine container to permit pouring of the fresh water and the shrimp lured therein into the aquarium. There is provided a suitable clamp arrangement for closing the tube to selectively prevent passage of brine solution and shrimp therethrough.

A further object of the invention resides in the provision of a method for hatching shrimp which will enable shrimp to be gathered in a manner free from contamination of the brine solution in which the shrimp are hatched and free from the residue of the hatching stage of the shrimp.

Yet another object of the present invention is to provide a brine shrimp hatching apparatus in which all the parts may be compactly secured and which is arranged for convenient use.

Still further objects and features of the invention reside in the provision of a brine shrimp hatching apparatus of simple construction, which can be manufactured by molding, or by any other convenient process out of readily available material such as various synthetic plastics, and which is efficient in use and inexpensive to produce, thereby permitting wide use and distribution.

These, together with the various ancillary objects and features of the invention which will become apparent as the following description proceeds, are attained by this method and apparatus for brine shrimp hatching, a preferred embodiment of the apparatus being illustrated in the accompanying drawing, by way of example only, wherein:

FIG. 1 is a perspective view of a brine shrimp hatching apparatus according to an embodiment of the present invention;

FIG. 2 is an enlarged vertical sectional view taken along the plane of line 2—2 in FIG. 1 illustrating in particular the brine shrimp hatching apparatus with the flexible tube joining the containers held in a closed position by the clamp means;

FIG. 3 is a partial sectional view similar to FIG. 2 but showing the manner in which the tube permits brine shrimp to pass therethrough into the transparent fresh water container; and FIG. 4 is a perspective view of one type of clamp means which may be employed.

With continuing reference to the accompanying drawings wherein like reference numerals designate similar parts throughout the various views, reference numeral 10 generally designates a brine shrimp hatching apparatus. This brine shrimp hatching apparatus includes a base 12, an opaque container 14, a transparent container 16, a tube 18 interconnecting the transparent container 16 and the opaque container 14, and a light source mounted on a base 12 and generally indicated at 20.

The base 12 is provided with a pair of recesses 22 and 24 therein. Extending inwardly of the recess 22 is a peripheral rib 26 while a rib 28 extends inwardly of the periphery of the recess 24. The ribs 26 and 28 are for the purpose of engaging beneath tongues 30 and 32 integrally formed about the periphery of the containers 14 and 16 respectively.

The container 14 is preferably formed of any suitable relatively inexpensive plastic materials such as polystyrene, polyethylene, polyurethyne, polyvinyl chloride, or the like. In addition to the tongue 30, the container 14 has a tongue 32 at the upper end thereof for engagement within a recess 34, formed in the side wall 36 of a cap generally indicated at 38. The cap is designed to close the container 14.

The tube 18 is integrally formed or integrally connected to the containers 14 and 16 at about the mid-point of each of the containers. Both of these containers 14 and 16 are adapted to be snapped into and resiliently retained on the base 12 so as to be movable with the base 12.

A clamp assembly generally indicated at 36 is designed to be positioned about the tube 18 to close the tube 18. The clamp may include two spaced leg portions 38 and 40 which are interconnected by a resilient metal U-shaped band 42 held thereto by rivets or screws 44. The outer portions 46 and 48 of the legs are spaced apart a greater distance to facilitate positioning of the clamp means 36 about the tube. The clamp means 36 is employed by positioning the device with the leg portions 38, 40 on either side of the tubes and then the legs are pulled to force the band 42 into embracing relationship about the tube.

Mounted on the base 12 is the light source 20 which includes a tube 50 providing a socket mounting 52 for a lamp or bulb 54 which is designed to be connected through a suitable electrical cord 56 of conventional construction to a source of electrical power. There is also mounted on the base by means of rivets 58 or other suitable means a reflector 60. Of course, the light source 20 can be arranged so that the lamp 54 and the reflector 60 are formed in a single unit if desired. The base 12 is recessed at 62 and 64 for the nut or like fastener 66 used to hold the tube 50 in place and for the cord 56 respectively. The lamp 54 and reflector 60 are so positioned opposite to the tube 18 that light rays passing through the transparent side walls of the container 60 will be directed into the tube 18.

In use, the container 14 and the container 16 are snapped in place. Then, with the clamp in the position to close the tube as shown in FIGS. 1 and 2, the container 14 is filled with a brine solution 70 to the level indicated by the "fill" line 72. A level line 74 at the same height as the "level" line 76 on the container 16 is provided. The "fill" line 72 is below the level line 74. The brine solution 70 comprises water and suitable salts which are mixed together in a prescribed ratio to approximate a sea water brine solution. A suitable amount of shrimp eggs are then placed in the container 14 and these immersed eggs are allowed to remain in the brine solution for a period of about 36 to 48 hours until the shrimp eggs hatch. It has been found that between 30% and 50% of the shrimp eggs will hatch so that there remains not only a residue of the eggs from the shrimps that are hatched, but also a considerable amount of unhatched eggs. If the brine solution with the shrimp were to be poured into a tank or aquarium containing tropical fish or the like, the tank or aquarium would be thoroughly contaminated and the lives of the tropical fish would be endangered. In order to collect the shrimp into water so that they may be readily fed to the tropical fish, the container 16 is filled to its "fill" line 80 which is above the level lines 76 and 74 so that the level of the contents 82 of the container 16 is above that of the level of the brine solution 70. Then, the clamp means 36 is removed and water which tends to seek its own level will flow towards the brine solution. This will cause the tube to become filled with fresh water and will minimize the possibility of any serious contamination of the fresh water 82 by the brine solution 70. Then, the lamp 54 is lighted so that light rays pass through the transparent walls into the container 16 and through the water 82 into the water in the tube 18 and the walls of the tube 18 to lure and attract the live shrimp in the brine solution 70 to swim towards the source of light. The brine shrimp will be attracted by the light and will swim through the tube 18 and into the container 16.

While both of the containers 14 and 16 can be easily removed by lifting them out of the base 12, when enough of the shrimp have passed into the water 82 in the container 16 as is necessary to feed the fish in the aquarium, the clamp means 36 is again installed as shown in FIGS. 1 and 2, closing the tube 18 preventing flow of fluid and also preventing passage of the shrimp. Then the container 16 can be lifted out of the recess 24 and twisted with respect to the base since the tube 18 is flexible thereby permitting the water with the live shrimp to be poured into the aquarium. The water and the shrimp are substantially free from any other contaminating ingredients and the tropical fish or other sea life in the aquarium will receive the fresh live food without contaminating elements.

Of course, the tank 16 can again be refilled and more shrimp can be allowed to pass into the fresh water thereby providing live food for yet another aquarium or live food at another time.

It has been found that the shrimp will live in fresh water for about 12 to 24 hours, but can exist for quite a considerable time in the brine solution. Further, food can be provided so that the shrimp can live to provide a source of live food of larger size.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A brine shrimp hatching apparatus comprising a first opaque container filled with a brine solution to a first level, a second transparent container spaced from said first container and filled with water to a second level above the level of said brine solution, a tube interconnecting and extending between said containers, means for selectively restricting the flow of fluid through said tube, and a light source disposed adjacent said second container for transmitting light rays through said second container and said tube to attract shrimp from said first container through said tube into said second container.

2. A brine shrimp hatching apparatus comprising a first opaque container filled with a brine solution to a first level, a removable cover for said first container, a second transparent container spaced from said first container and filled with water to a second level above the level of said brine solution, a flexible tube interconnecting and extending between said containers, clamp means for selectively clamping said tube to prevent passage of fluid through said tube, and a light source disposed adjacent said second container transmitting light rays through said second container and said tube to attract shrimp from said first container through said tube into said second container when said clamp means is released.

3. A brine shrimp hatching apparatus comprising a first opaque plastic container filled with a brine solution to a first level, said first container having a removable cover, a second transparent container spaced from said first container and filled with water to a second level above the level of said brine solution, a flexible tube integral with and interconnecting said containers, said cover when in place restricting flow of fluid through said tube, and a light source disposed adjacent said second container opposite said tube for transmitting light rays through said second container and said tube to attract shrimp from said first container through said tube into said second container.

4. A brine shrimp hatching apparatus comprising a base having recesses therein, a first opaque container disposed in one of said recesses, said first container filled with a brine solution to a first level, a second transparent container disposed in another of said recesses, said second container being filled with water to a second level above the level of said brine solution, a flexible tube interconnecting and extending between said containers, a light source secured to said base and disposed adjacent said second container transmitting light rays through said second container and said tube to attract shrimp from said first container through said tube into said second container, and clamp means disposed about said tube for clamping said tube to close said tube against passage therethrough.

5. A brine shrimp hatching apparatus comprising a base, a first opaque container filled with a brine solution to a first level, said first container being removably secured to said base, a second transparent container spaced from said first container and filled with water to a second level above the level of said brine solution, said second container being removably secured to said base, a flexible tube interconnecting and extending between said containers, means for selectively restricting the flow of fluid through said tube said tube being capable of being twisted so that said second container can be turned relative to said first container to spill out the contents of said second container, and a light source disposed adjacent said second container transmitting light rays through said second container and said tube to attract shrimp from said first container through said tube into said second container.

References Cited in the file of this patent

UNITED STATES PATENTS 2,984,207 Drake _____ May 16, 1961